(12) United States Patent
Tu

(10) Patent No.: US 7,516,958 B2
(45) Date of Patent: Apr. 14, 2009

(54) AUTO DOCUMENT FEEDER

(75) Inventor: Hao Tu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 223 days.

(21) Appl. No.: 11/505,483

(22) Filed: Aug. 17, 2006

(65) Prior Publication Data

US 2007/0080495 A1 Apr. 12, 2007

(30) Foreign Application Priority Data

Oct. 7, 2005 (TW) .............................. 94135164 A

(51) Int. Cl.
*B65H 39/10* (2006.01)

(52) U.S. Cl. ...................... 271/291; 271/3.14; 271/4.01; 271/4.08; 271/4.1; 399/367; 399/369; 399/373; 399/374

(58) Field of Classification Search ................. 271/274, 271/291, 3.14, 4.01, 4.08, 4.1, 186, 65; 399/367, 399/369, 373, 374

See application file for complete search history.

(56) References Cited

U.S. PATENT DOCUMENTS

| | | | | |
|---|---|---|---|---|
| 5,534,989 A | * | 7/1996 | Rubscha et al. ............. | 399/381 |
| 5,669,056 A | * | 9/1997 | Rubscha ..................... | 399/367 |
| 5,784,680 A | * | 7/1998 | Taruki ........................ | 399/374 |
| 5,887,865 A | * | 3/1999 | Ishimaru .................... | 271/4.1 |
| 5,926,681 A | * | 7/1999 | Ishimaru .................... | 399/367 |
| 5,947,464 A | * | 9/1999 | Takada ....................... | 271/3.03 |
| 6,047,959 A | * | 4/2000 | Baba et al. .................. | 271/3.01 |
| 6,181,443 B1 | * | 1/2001 | Takahashi et al. ........... | 358/498 |
| 6,209,861 B1 | * | 4/2001 | Kakuta et al. ............... | 271/3.02 |
| 6,215,976 B1 | * | 4/2001 | Shida et al. ................. | 399/367 |
| 6,321,064 B1 | * | 11/2001 | Mizubata et al. ............ | 399/370 |
| 6,381,439 B2 | * | 4/2002 | Hirota et al. ................ | 399/374 |
| 6,585,258 B1 | * | 7/2003 | Hirota et al. ................ | 271/186 |
| 6,746,013 B2 | * | 6/2004 | Shih ............................ | 271/186 |
| 6,814,353 B1 | * | 11/2004 | Kakuta et al. ............... | 271/186 |
| 7,021,619 B2 | * | 4/2006 | Watanabe et al. ........... | 271/3.14 |
| 2004/0212138 A1 | * | 10/2004 | Kakuta et al. ............... | 271/3.14 |
| 2007/0080490 A1 | * | 4/2007 | Tu .............................. | 271/3.14 |
| 2007/0081212 A1 | * | 4/2007 | Tonami et al. .............. | 359/197 |

* cited by examiner

*Primary Examiner*—Patrick H Mackey
*Assistant Examiner*—Prasad V Gokhale
(74) *Attorney, Agent, or Firm*—Birch, Stewart, Kolasch & Birch, LLP

(57) ABSTRACT

An auto document feeder includes a housing unit, spatially interconnected first and second paths, an inverting path in spatial communication with the first path, a bypass path spatially inter communicating the second path and the inverting path, a feeding roller unit for feeding documents onto the first path, first and second transfer roller units disposed respectively on the first and second paths, an ejecting roller unit aligned with the second path and the inverting path, and two switching gates disposed pivotally on the housing unit for guiding movement of the documents. The bypass path and the switching gates are internal to the ejecting roller unit so as to reduce document transportation travel.

8 Claims, 4 Drawing Sheets

AUTO DOCUMENT FEEDER

CROSS-REFERENCE TO RELATED APPLICATION

This application claims priority of Taiwanese Application No. 094135164, filed on Oct. 7, 2005.

BACKGROUND OF THE INVENTION

1. Field of the Invention

This invention relates to an office machine, and more particularly to an auto document feeder for use in an office machine.

2. Description of the Related Art

U.S. Pat. No. 5,784,680 discloses a compact auto-document feeder for an image forming apparatus that includes a switching gate, which is disposed pivotally downstream of a second feeding path and above an ejecting tray to lead selectively documents from the second feeding path to the ejecting tray, a switch-back path, or to an inverting path.

Since the switching gate is external to an ejecting roller, a switch-back path and two switch-back rollers are required for facilitating ejecting of the documents. As such, the structure of the auto document feeder is complicated, thereby resulting in an increased volume of the auto document feeder.

SUMMARY OF THE INVENTION

The object of this invention is to provide an auto document feeder that has a simple structure and that is compact.

According to this invention, an auto document feeder is adapted to be disposed on an image forming apparatus. The image forming apparatus includes a scanning unit. The auto document feeder includes a housing unit having a first end portion, a second end portion opposite to the first end portion, and a feeding tray disposed on the first end portion and adapted to allow stacked duplex documents to be placed thereon. A first path is disposed in the housing unit, and has an upstream end and a downstream end extending toward the first end portion of the housing unit. A second path has an upstream end in spatial communication with the downstream end of the first path such that the scanning unit is disposed between the downstream end of the first path and the upstream end of the second path, and a downstream end. An inverting path extends from the first end portion to the second end portion, and is disposed above the second path. The inverting path has an upstream end and a downstream end. A bypass path is disposed in the first end portion of the housing unit, and has an upstream end in spatial communication with the second path, and a downstream end in spatial communication with the inverting path and disposed in proximity to the upstream end of the inverting path. A feeding roller unit is disposed between the feeding tray and the upstream end of the first path, and is adapted to transfer the duplex documents from the feeding tray onto the first path. A first transfer roller unit is disposed on the first path, and is adapted to transfer the duplex documents from the first path onto the second path. A second transfer roller unit is disposed on the second path and upstream of the upstream end of the bypass path, and is adapted to move the duplex documents along the second path. An ejecting roller unit is disposed in proximity to the downstream ends of the second path and the bypass path such that the bypass path is disposed between the ejecting roller unit and the second transfer roller unit. The ejecting roller unit is adapted to receive the duplex documents from the downstream ends of the second path and the bypass path. A switching gate unit is internal to the ejecting roller unit, and includes first and second switching gates. The first switching gate is disposed pivotally on the housing unit, and has a free end pivotable within the second path and the bypass path between first and second positions. In the first position, the free end of the first switching gate extends onto a portion of the second path immediately downstream of the upstream end of the bypass path so as to limit movement of the duplex documents from the second path onto the bypass path. In the second position, the upstream end of the bypass path is closed by the free end of the first switching gate so as to limit movement of the duplex documents from the second transfer roller unit onto the ejecting roller unit via the downstream end of the second path. The second switching gate is disposed pivotally on the housing unit, and has a free end pivotable within the inverting path and the bypass path between third and fourth positions. In the third position, the free end of the second switching gate extends onto a portion of the inverting path immediately downstream of the downstream end of the bypass path so as to limit movement of the duplex documents from the bypass path onto the inverting path. In the fourth position, the downstream end of the bypass path is closed by the free end of the second switching gate so as to limit movement of the duplex documents from the inverting path onto the first path.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
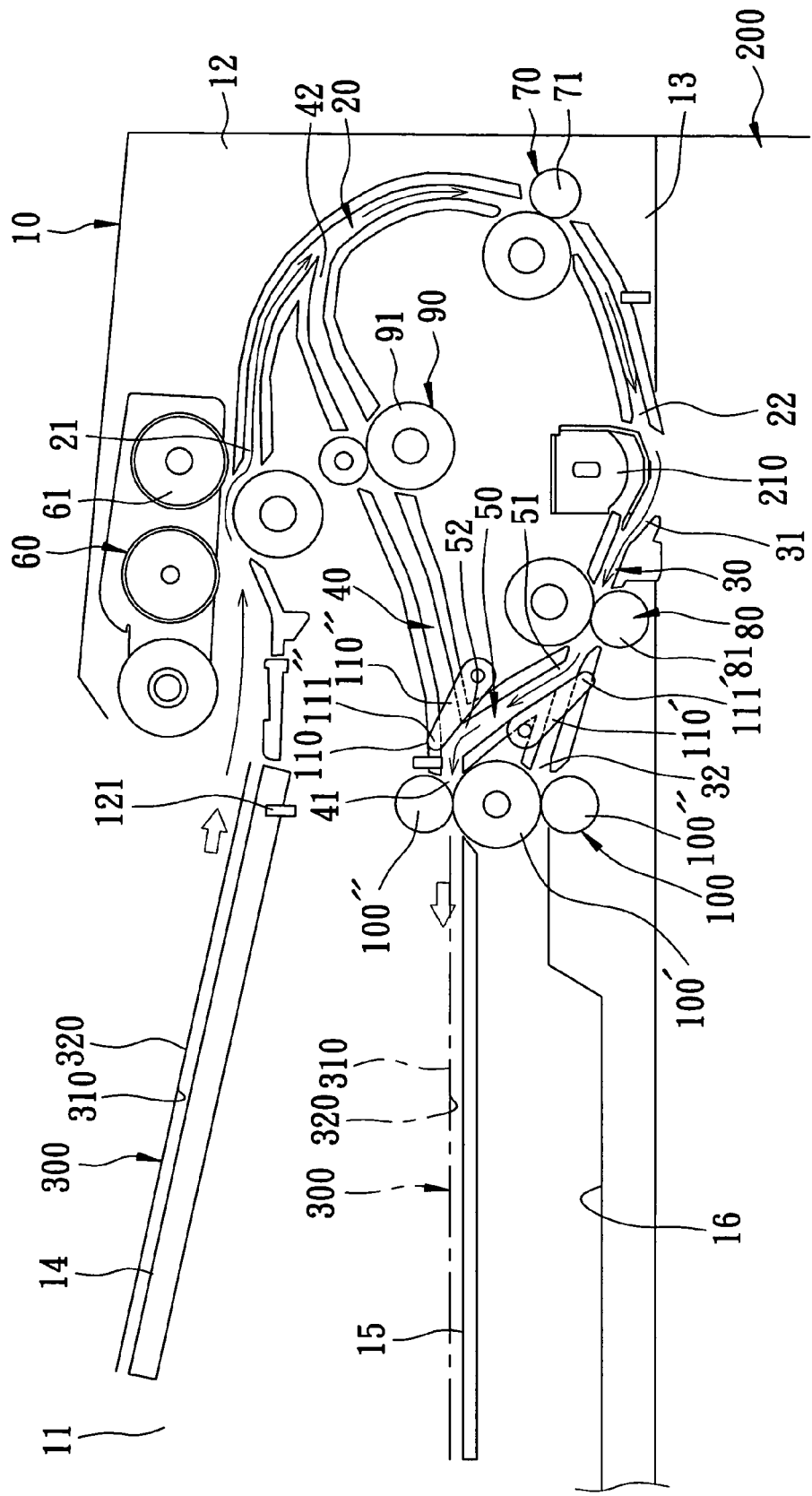
FIG. 1 is a schematic side view of the preferred embodiment of an auto document feeder according to this invention when first and second switching gates are disposed respectively in first and third positions.
Figure 2:
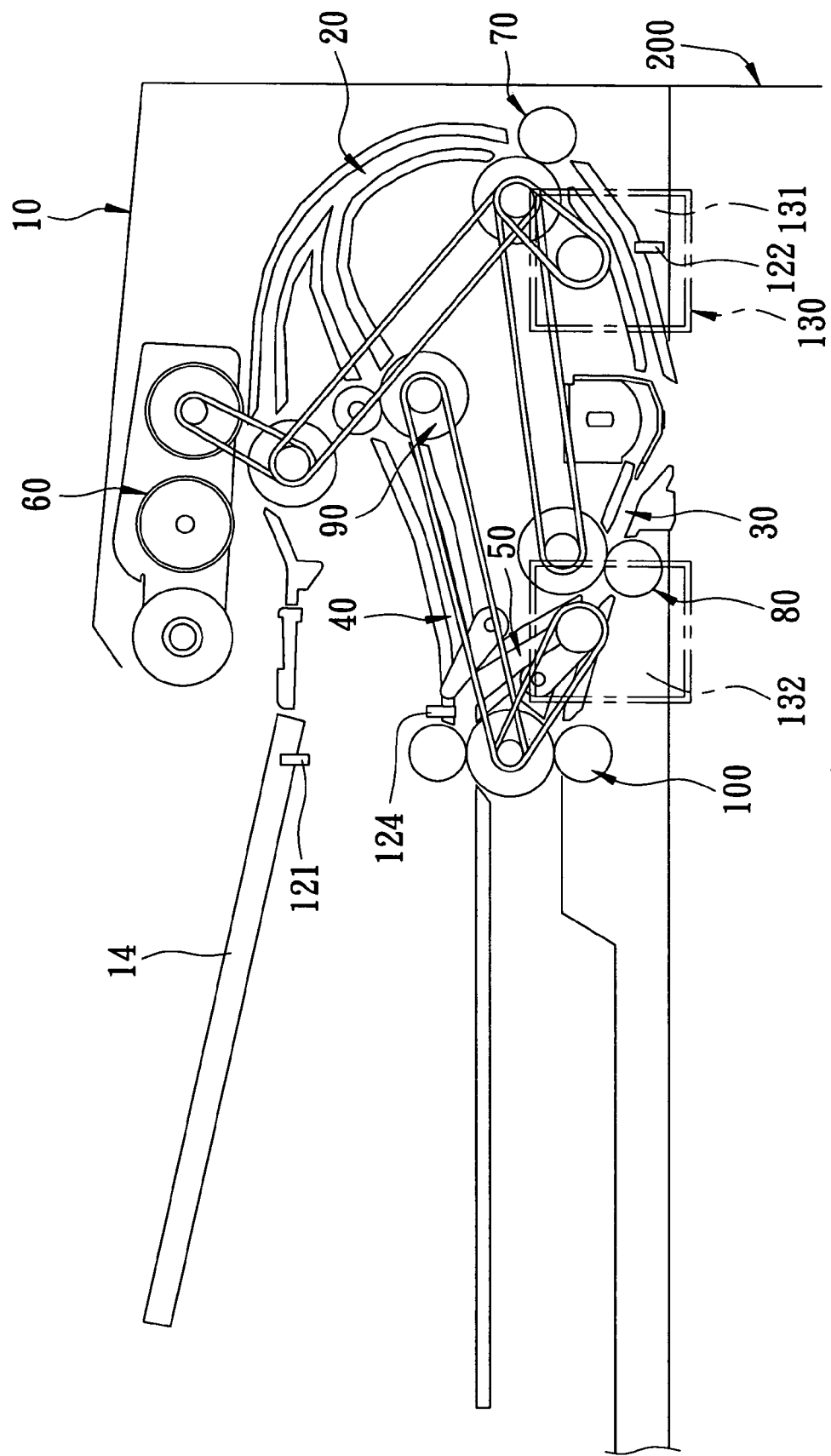
FIG. 2 is a schematic side view of the preferred embodiment, illustrating arrangement of a driving unit and a sensing unit.

Referring to FIGS. 1 and 2, the preferred embodiment of an auto document feeder according to this invention is disposed on an image forming apparatus 200 (such as a copier) for feeding duplex documents 300. Each of the duplex documents 300 has opposite first and second side surfaces 310, 320. The image forming apparatus 200 includes a scanning unit 210. The auto document feeder includes a housing unit 10, a first path 20 disposed in the housing unit 10, a second path 30 in spatial communication with the first path 20, an inverting path 40 disposed above the second path 30, an inclined bypass path 50 interconnecting the second path 30 and the inverting path 40, a feeding roller unit 60 aligned with the first path 20, a first transfer roller unit 70 disposed on the first path 20, a second transfer roller unit 80 disposed on the second path 30, a third transfer roller unit 90 disposed on the inverting path 40, an ejecting roller unit 100, a switching gate unit 110 internal to the ejecting roller unit 100, a sensing unit 120, and a driving unit 130.

The housing unit 10 has a first end portion 11, a second end portion 12 opposite to the first end portion 11, a bottom portion 13 disposed in proximity to the image forming apparatus 200, a feeding tray 14 disposed on the first end portion 11 for placement of the duplex documents 300 thereon, an upper ejecting tray 15 disposed under and spaced apart from the feeding tray 14, and a lower ejecting tray 16 disposed under and spaced apart from the upper ejecting tray 15.

The first path 20 is curved, and has an upstream end 21 for receiving the duplex documents 300 from the feeding tray 14, and a downstream end 22 extending toward the first end portion 11 of the housing unit 10 and disposed in proximity to the bottom portion 13 of the housing unit 10.

The second path 30 has an upstream end 31 in spatial communication with the downstream end 22 of the first path 20, and a downstream end 32 extending toward the first end portion 11 of the housing unit 10 and aligned with and adjacent to the lower ejecting tray 16. The lower ejecting tray 16 is external to the downstream end 32 of the second path 30. The scanning unit 210 is disposed between the downstream end 22 of the first path 20 and the upstream end 31 of the second path 30.

The inverting path 40 extends from the first end portion 11 to the second end portion 12, and is disposed above the second path 30. The inverting path 40 has an upstream end 41 aligned with and adjacent to the upper ejecting tray 15, and a downstream end 42 in spatial communication with the first path 20 and disposed between the upstream and downstream ends 21, 22 of the first path 20 such that the duplex documents 300 are limited to move from the downstream end 42 of the inverting path 40 toward the downstream end 22 of the first path 20. The upper ejecting tray 15 is external to the upstream end 41 of the inverting path 40.

The bypass path 50 is disposed in the first end portion 11 of the housing unit 10, and has an upstream end 51 in spatial communication with the second path 30, and a downstream end 52 in spatial communication with the inverting path 40 and disposed in proximity to the upstream end 41 of the inverting path 40.

The feeding roller unit 60 is disposed between the feeding tray 14 and the upstream end 21 of the first path 20, and includes a plurality of feeding rollers 61 for transferring the duplex documents 300 from the feeding tray 14 onto the first path 20 one at a time.

The first transfer roller unit 70 includes two first transfer rollers 71 for transferring the duplex documents 300 from the first path 20 onto the second path 30.

The second transfer roller unit 80 includes two second transfer rollers 81 that are disposed upstream of the upstream end 51 of the bypass path 50 for transferring the duplex documents 300 along the second path 30.

The third transfer roller unit 90 includes two third transfer rollers 91 for transferring the duplex documents 300 from the upstream end 41 of the inverting path 40 onto the first path 20 along the inverting path 40.

The ejecting roller unit 100 is disposed in proximity to the downstream ends 32, 52 of the second path 30 and the bypass path 50, and between an assembly of the upper and lower ejecting trays 15, 16 and an assembly of the second path 30, the inverting path 40, and the switching gate unit 110. The bypass path 50 is disposed between the ejecting roller unit 100 and the second transfer roller unit 80. The ejecting roller unit 100 includes a driving roller 100' controllable to rotate in the housing unit 10, and two roller followers 100" flanking and in contact with the driving roller 100' and aligned respectively with the downstream end 32 of the second path 30 and the upstream end 41 of the inverting path 40 so as to receive the duplex documents 300 from the downstream ends 32, 52 of the second path 30 and the bypass path 50. The lower roller follower 100" is rotatable by the driving roller 100' so as to eject the duplex documents 300 from the downstream end 32 of the second path 30. The upper roller follower 100" is rotatable by the driving roller 100' so as to move the duplex documents 300 onto the upstream end 41 of the inverting path 40.

The switching gate unit 110 includes first and second switching gates 110', 110" disposed pivotally on the housing unit 10 and respectively in proximity to the upstream and downstream ends 51, 52 of the bypass path 50. The first and second switching gates 110', 110" are located respectively to two opposite sides of the bypass path 50. The first switching gate 110' is disposed between the ejecting roller unit 100 and the bypass path 50, and has a free end 111' pivotable within the second path 30 and the bypass path 50 between a first position shown in FIG. 1 and a second position shown in FIG. 3. In the first position, the free end 111' of the first switching gate 110' extends onto a portion of the second path 30 immediately downstream of the upstream end 51 of the bypass path 50 so as to limit movement of the duplex documents 300 from the second path 30 onto the bypass path 50. In the second position, the upstream end 51 of the bypass path 50 is closed by the free end 111' of the first switching gate 110' so as to limit movement of the duplex documents 300 from the second transfer roller 80 onto the ejecting roller unit 100 via the downstream end 32 of the second path 30. The second switching gate 110" has a free end 111" pivotable within the inverting path 40 and the bypass path 50 between a third position shown in FIG. 1 and a fourth position shown in FIG. 3. In the third position, the free end 111" of the second switching gate 110" extends onto a portion of the inverting path 40 immediately downstream of the downstream end 52 of the bypass path 50 so as to limit movement of the duplex documents 300 from the bypass path 50 onto the inverting path 40. In the fourth position, the downstream end 52 is closed by the free end 111" of the second switching gate 110" so as to limit movement of the duplex documents 300 from the inverting path 40 onto the first path 20.

The sensing unit 120 includes a first sensor 121 disposed on the feeding tray 14 and in proximity to the feeding roller unit 60, a second sensor 122 disposed between the first transfer roller unit 70 and the scanning unit 210, and a third sensor 124 disposed at the upstream end 41 of the inverting path 40.

Figure 4:
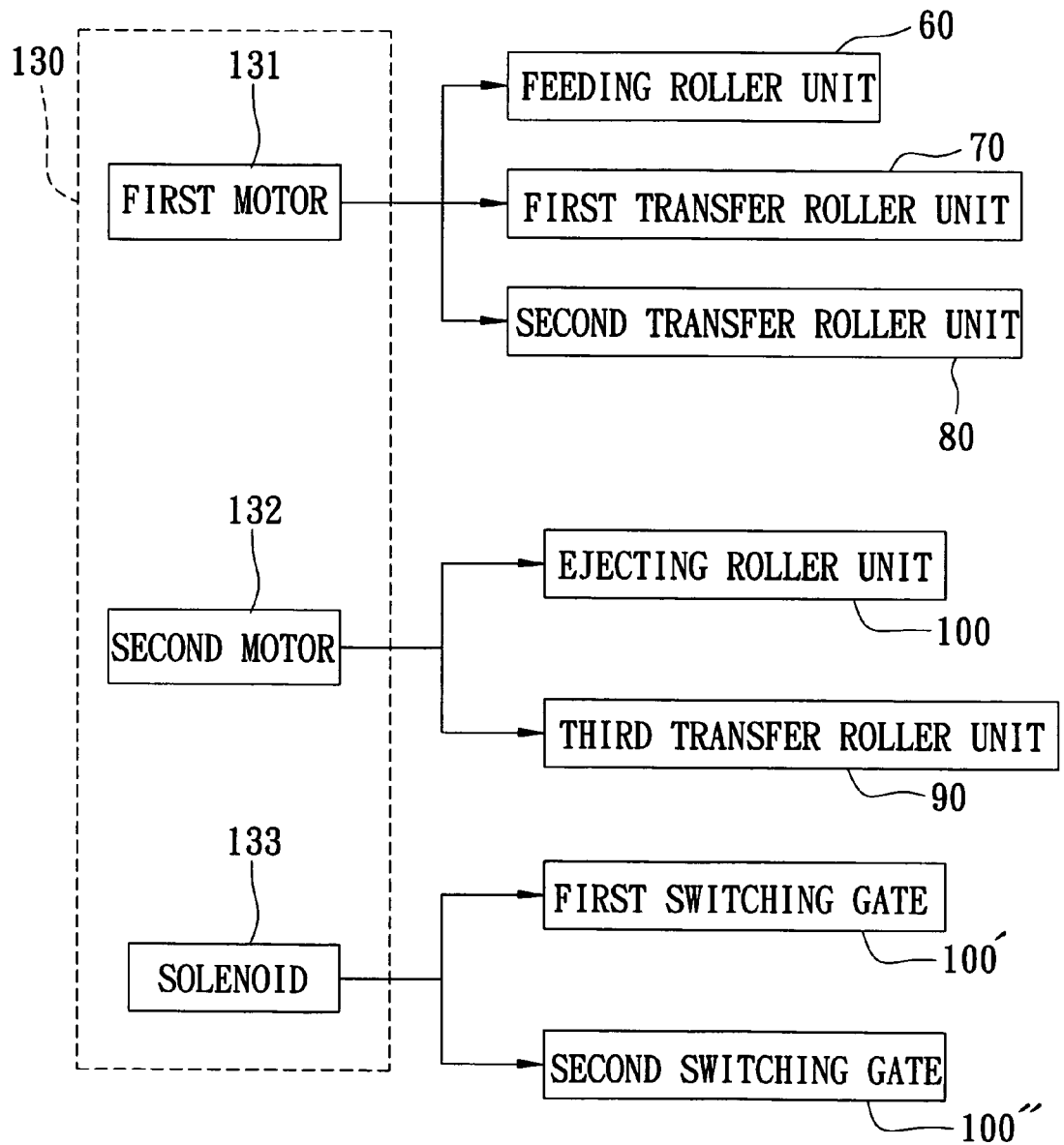
FIG. 4 is a schematic block diagram of the preferred embodiment, illustrating how some elements are controlled by the driving unit.

With further reference to FIG. 4, the driving unit 130 includes a first motor 131 for driving the feeding roller unit 60, and the first and second transfer roller units 70, 80, a second motor 132 for driving the ejecting roller unit 100 and the third transfer roller unit 90, and a solenoid 133 for rotating the first and second switching gates 110', 110".

To operate the image forming apparatus 200, the image forming apparatus 200 is first placed in a duplex mode, after which the duplex documents 300 are stacked on the feeding tray 14 such that the first side surface 310 of each of the duplex documents 300 faces downwardly. Following user activation of a copy start key (not shown), when leading edges of the duplex documents 300 are detected by the first sensor 121, a controller (not shown) activates the first motor 131 and, thus, the feeding roller unit 60, the first transfer roller unit 70, and the second transfer roller unit 80. As such, the topmost duplex document 300 is moved from the feeding tray 14 onto the first path 20 by the feeding roller unit 60, and subsequently from the first path 20 onto the second path 30 by the first transfer roller unit 70. When a leading edge of the topmost duplex document 300 is detected by the second sensor 122, the controller pivots the free ends 111', 111" of the first and second switching gates 110', 110" to the first and third positions, respectively, so as to spatially intercommunicate the second path 30 and the inverting path 40, and activates the scanning unit 210, the ejecting roller unit 100, and the third transfer roller unit 90. The ejecting roller unit 100 is activated at this time such that the driving roller 100' thereof rotates counterclockwise. Hence, the first side surface 310 of the topmost duplex document 300 is scanned, and the topmost duplex document 300 moves from the second path 30 onto the bypass path 50. Because the driving roller 100' rotates counterclockwise, the topmost duplex document 300 moves from the downstream end 52 of the bypass path 50 onto the inverting path 40 and into a space between the driving roller 100' and the upper roller follower 100". At this time, the first side surface 310 of the topmost duplex document 300 faces upwardly.

Figure 3:
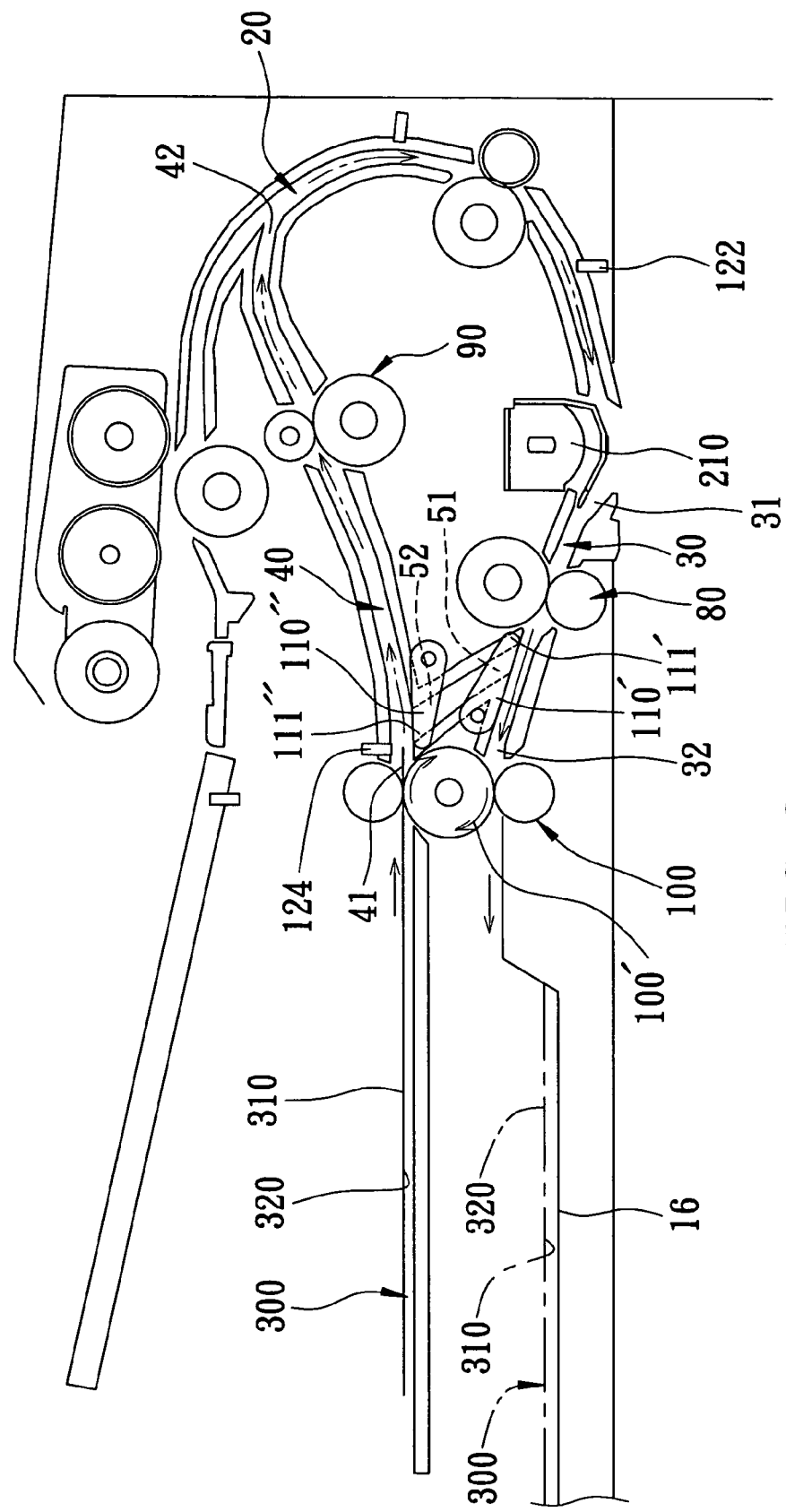
FIG. 3 is a schematic side view of the preferred embodiment when the first and second switching gates are disposed respectively in second and fourth positions.

Referring to FIGS. 2 and 3, when the topmost duplex document 300 is present on the ejecting roller unit 100 and a tailing edge of the topmost duplex document 300 is detected by the third sensor 124, the controller pivots the free end 111', 111" of the first and second switching gates 110', 110" to the second and fourth positions, respectively, and activates the ejecting roller unit 100 and the third transfer roller unit 90. At this time, the ejecting roller unit 100 is activated such that the driving roller 100' thereof rotates clockwise. Since the downstream end 52 of the bypass path 50 is closed, the topmost duplex document 300 moves onto the inverting path 40 and into a space between the third transfer rollers 91. By operation of the third transfer roller unit 90, the topmost duplex document 300 is subsequently moved onto the first path 20.

When the topmost duplex document 300 moves from the first path 20 onto the second path 30, the second side surface 320 of the topmost duplex document 300 is scanned by the scanning unit 210. Subsequently, the topmost duplex document 300 is moved from the second path 30 onto the lower ejecting tray 16 by the second transfer roller unit 80 and the ejecting roller unit 100.

Since the switching gate unit 110 is internal to the ejecting roller unit 100, the auto document feeder has the advantages of simple structure, compact volume, and short document transfer travel.

Referring to FIG. 1, the image forming apparatus 200 can also be operated in a simplex mode. In the simplex mode, the free ends 111', 111" of the first and second switching gates 110', 110" are pivoted respectively to the first and third positions. This allows simplex documents to move from the feeding tray 14 to the upper ejecting tray 15 along a path defined by the first path 20, the second path 30, the bypass path 50, and the ejecting roller unit 100.

It is noted that, if the torque output of the ejecting roller unit 100 is increased and/or the distance between the ejecting roller unit 100 and the first transfer roller unit 70 is reduced so as to enable the duplex documents 300 to be moved onto the first transfer roller unit 70 by the ejecting roller unit 100, the third transfer roller unit 90 can be omitted.

With this invention thus explained, it is apparent that numerous modifications and variations can be made without departing from the scope and spirit of this invention. It is therefore intended that this invention be limited only as indicated by the appended claims.

I claim:

1. An auto document feeder adapted to be disposed on an image forming apparatus, the image forming apparatus including a scanning unit, said auto document feeder comprising:
    a housing unit having a first end portion, a second end portion opposite to said first end portion, and a feeding tray disposed on said first end portion;
    a first path disposed in said housing unit and having an upstream end and a downstream end extending toward said first end portion of said housing unit;
    a second path having an upstream end in spatial communication with said downstream end of said first path such that the scanning unit is disposed between said downstream end of said first path and said upstream end of said second path, and a downstream end;
    an inverting path extending from said first end portion to said second end portion and disposed above said second path, said inverting path having an upstream end and a downstream end and in spatial communication with said first path;
    a bypass path disposed in said first end portion of said housing unit and having an upstream end in spatial communication with said second path, and a downstream end in spatial communication with said inverting path;
    a feeding roller unit disposed between said feeding tray and said upstream end of said first path;
    a first transfer roller unit disposed on said first path;
    a second transfer roller unit disposed on said second path and upstream of said upstream end of said bypass path;
    an ejecting roller unit disposed in proximity to said downstream ends of said second path and said bypass path and external to said bypass path;
    a switching gate unit internal to said ejecting roller unit and including
        a first switching gate disposed pivotally on said housing unit and having a free end pivotable within said second path and said bypass path between a first position whereat said free end of said first switching gate extends onto a portion of said second path immediately downstream of said upstream end of said bypass path, and a second position whereat said upstream end of said bypass path is closed by said free end of said first switching gate, and
        a second switching gate disposed pivotally on said housing unit and having a free end pivotable within said inverting path and said bypass path between a third position whereat said free end of said second switching gate extends onto a portion of said inverting path immediately downstream of said downstream end of said bypass path, and a fourth position whereat said downstream end of said bypass path is closed by said free end of said second switching gate;
    a third transfer roller unit disposed on said inverting path; and
    a driving unit including
        a first motor for driving said feeding roller unit, and said first and second transfer roller units,
        a second motor for driving said ejecting roller unit and said third transfer roller unit, and
        a solenoid for rotating said first and second switching gates.

2. The auto document feeder as claimed in claim 1, wherein said ejecting roller unit includes a driving roller controllable to rotate in said housing unit, and two roller followers flanking and in contact with said driving roller and aligned respectively with said downstream end of said second path and said upstream end of said inverting path.

3. The auto document feeder as claimed in claim 1, wherein said first and second switching gates are located respectively to two opposite sides of said bypass path, said first switching gate being disposed between said ejecting roller unit and said bypass path.

4. The auto document feeder as claimed in claim 1, further comprising a sensing unit that includes:
    a first sensor disposed on said feeding tray and in proximity to said feeding roller unit;
    a second sensor adapted to be disposed between said first transfer roller unit and the scanning unit; and
    a third sensor disposed at said upstream end of said inverting path.

5. The auto document feeder as claimed in claim 1, wherein said housing unit further includes an upper ejecting tray disposed under said feeding tray, and a lower ejecting tray disposed under said upper ejecting tray, said upper and lower ejecting trays being external respectively to said upstream end of said inverting path and said downstream end of said second path.

6. The auto document feeder as claimed in claim 5, wherein said downstream end of said second path is aligned with said lower ejecting tray.

7. The auto document feeder as claimed in claim 5, wherein said upstream end of said inverting path is aligned with said upper ejecting tray.

8. The auto document feeder as claimed in claim 5, wherein said ejecting roller unit is disposed between an assembly of said upper and lower ejecting trays and an assembly of said second path and said inverting path.

\* \* \* \* \*